Patented Mar. 20, 1945

2,371,766

UNITED STATES PATENT OFFICE 2,371,766

NEW COMPOUND

Joy G. Lichty, Stow, Ohio, assignor to Wingfoot Corporation, Akron, Ohio, a corporation of Delaware No Drawing. Application October 3, 1942, Serial No. 460,652

1 Claim. (Cl. 260—592)

This invention relates to alpha, alpha, beta trichloropropiophenone. The preparation of the compound is illustrated by the following formula:

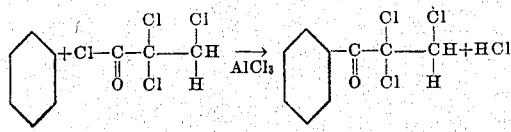

To a mixture of 70 grams of anhydrous AlCl₃ and 300 cc. of anhydrous benzene was added 98 grams of alpha, alpha, beta trichloropropionyl chloride. Immediately the solution warmed, evolved HCl, and became dark. This was allowed to stand overnight, and then the solution was hydrolyzed with ice-cold dilute aqueous HCl. The benzene layer was separated and distilled. There was obtained a good yield of alpha, alpha, beta trichloropropiophenone, boiling point—170–172° C./38 mm.; $N_D = 1.523^{28}$.

What I claim is:

Alpha, alpha, beta trichloropropiophenone.

JOY G. LICHTY.